July 2, 1929.  J. A. KENNEY  1,719,770
DISTRIBUTOR
Filed May 8, 1925   2 Sheets-Sheet 1

John A. Kenney
INVENTOR

BY Victor J. Evans
ATTORNEY

WITNESS:

July 2, 1929.  J. A. KENNEY  1,719,770
DISTRIBUTOR
Filed May 8, 1925   2 Sheets-Sheet 2
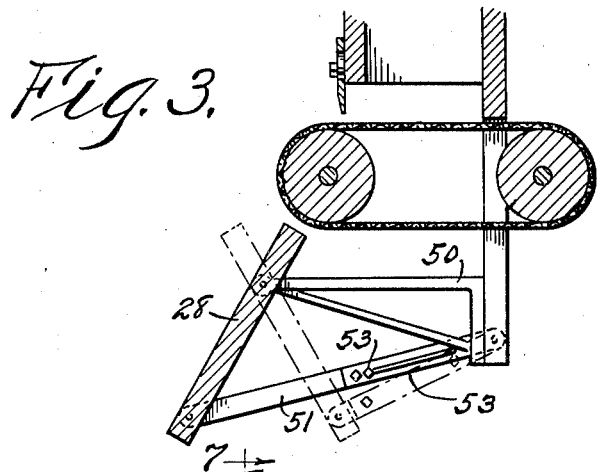
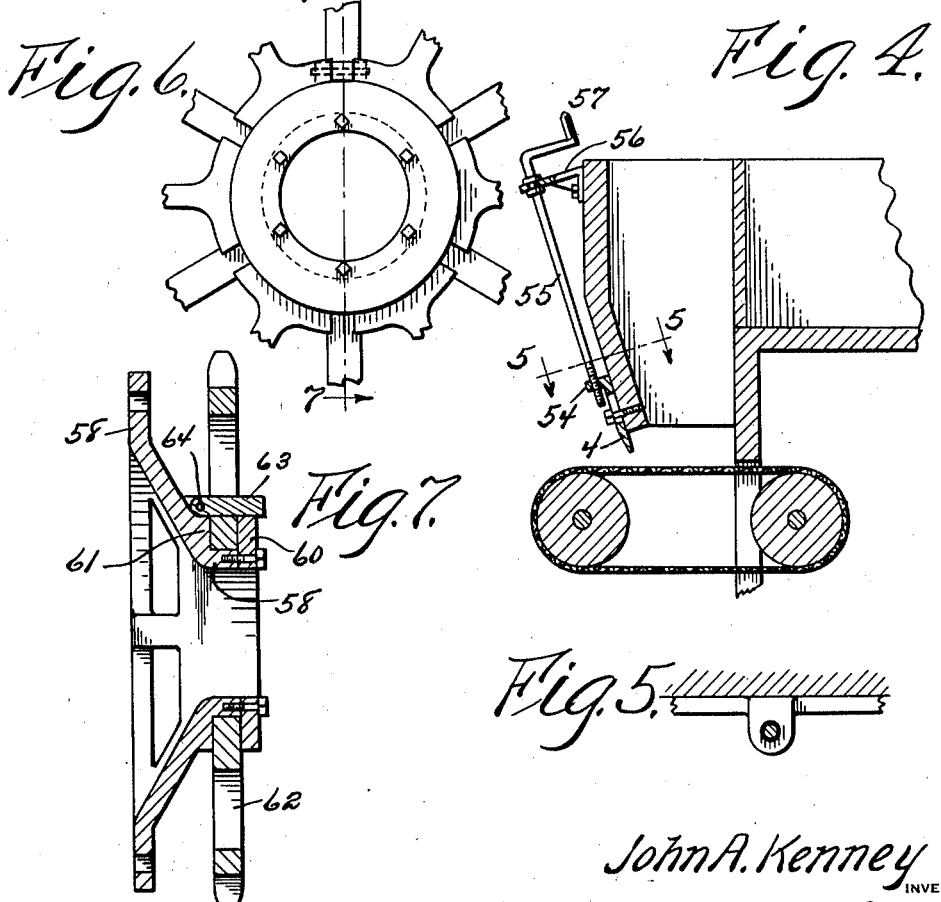
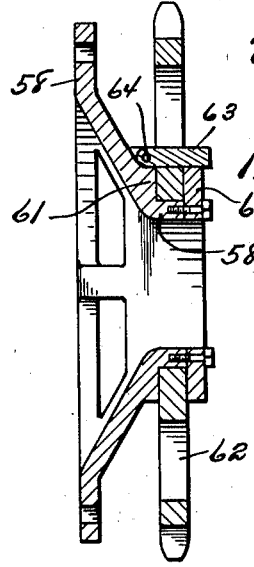
John A. Kenney
INVENTOR Patented July 2, 1929.

1,719,770

UNITED STATES PATENT OFFICE.

JOHN A. KENNEY, OF BURBANK, CALIFORNIA.

DISTRIBUTOR.

Application filed May 8, 1925. Serial No. 28,885.

My present invention may be considered in the nature of a road building machine.

An object is the provision in a machine for this purpose, of means for delivering onto a road surface determined quantities of stone, gravel, etc., when the machine is propelled either in a forward or backward direction and to prevent the outlet of such material when the device is propelled in either direction and when the material is not desired on the road surface.

A further object is to provide a wheeled body, such as a motor truck, with a chute at the rear end thereof, through which material from the body is delivered onto an endless apron and from thence onto a directing member or board to the road surface, means being provided for regulating the outflow of the material from the hopper, means being likewise provided for actuating the apron on the movement of the conveyor in either direction and means being further provided for rendering such motion imparting means inoperative.

To the attainment of the above broadly stated objects and others which will appear as the nature of the invention is better understood, reference is to be had to the accompanying drawings which form part of this application.

Figure 3 is a transverse sectional view showing the guide board adjustably supported.

Figure 4 is a sectional view substantially similar to Figure 3 but taken above the guide board to disclose a manner in which the valve plate may be adjusted.

Figure 5 is a sectional view on the line 5—5 of Fig. 4.

Figure 6 is an elevation of the hub portion of a modified form of sprocket wheel which may be employed.

Figure 7 is a section on the line 7—7 of Figure 6.

Figure 1:
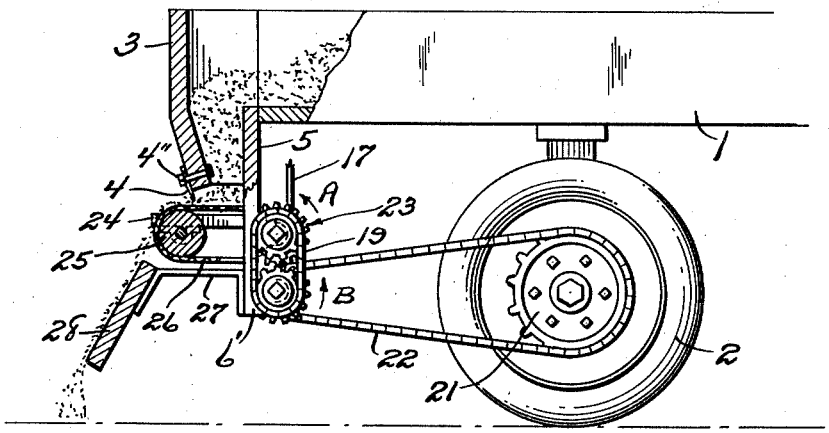
Figure 1 is a side elevation of a wheeled body, such as a motor truck, provided with the improvement, parts being in section.

Preferably, my improvement is detachably associated with the body of a truck or similar vehicle, although the same may remain a fixture thereon if desired. Also while my improvement is primarily designed for use in road building and repairing it will be obvious, from the following description, that the same may be also successfully employed as a manure or fertilizer distributor, and for other purposes.

Referring now to the drawings in detail, the numeral 1 designates the body of a truck or like vehicle and 2 the rear or traction wheels thereof. The rear of the body 1 is open and has attached thereto a chute 3. The chute extends below the bottom of the truck body, and has its outer wall inclined inwardly. On the said inclined wall there is secured a plate 4. The plate, at desired intervals, is provided with elongated slots 4' through which pass headed binding elements 4''. In this manner the plate 4 may be held adjusted on the chute, and the plate regulates the outflow of crushed stone or gravel that is delivered through the chute onto a road bed.

The inner wall 5 of the chute 3 has on its ends depending members or plates 6 and 6' respectively. The plates 6—6' are provided with bearings for a shaft 7, while the plate 6' is provided with an additional bearing for a shaft 8. The inner end of the shaft 8 is also received in a bearing provided on a depending member 9 associated with the chute 3. On the shafts 7 and 8 there are intermeshing gears 10 and 11, respectively, the gear 10 being fixed on the shaft 7 while the gear 11 is loose on the shaft 8. Opposite the gears 10 and 11, and on the shafts 7 and 8, there are sprocket wheels 12 and 13, respectively. The sprocket wheel 12 is fixed on the shaft 7 but the sprocket wheel 13 is loose on the shaft 8. The confronting faces of the wheels 12 and 13 have hubs formed with clutch teeth 14 and 15, respectively. Movable on a spline or in a splineway on the shaft 8 between the clutch surfaces 14 and 15 there is a slidable clutch member 16. This member is formed with a continuous peripheral groove for the forked end of a lever 17 that is pivoted on a bracket 18 which is secured on and extends outwardly from the plate 6'.

The sprocket wheels 12 and 13 have trained therearound a chain 19, and fixed on the shaft 8 there is a second sprocket wheel 20. The spracket wheel 20 is disposed in a line with a sprocket wheel 21 that is fixed on one of the rear or drive wheels 2, and trained around the sprocket wheels 20 and 21 there is a chain 22.

Fixed on the shaft 7 there is a roller 23. Journaled in suitable bearings carried by supporting brackets 24, which are fixed on the plates 6 and 6', below the outlet mouth of the chute 3, there is a second roller 25. Trained around the rollers 23 and 25 there is an endless belt 26.

Fixed on the plates 6 and 6', below the endless belt or conveyor 26, there are outwardly directed arms 27 that have their ends inclined downwardly and outwardly with respect to the chute. On the angle ends of the arms 27 there is fixed a board 28, the said board being in the nature of a directing member.

Figure 2:
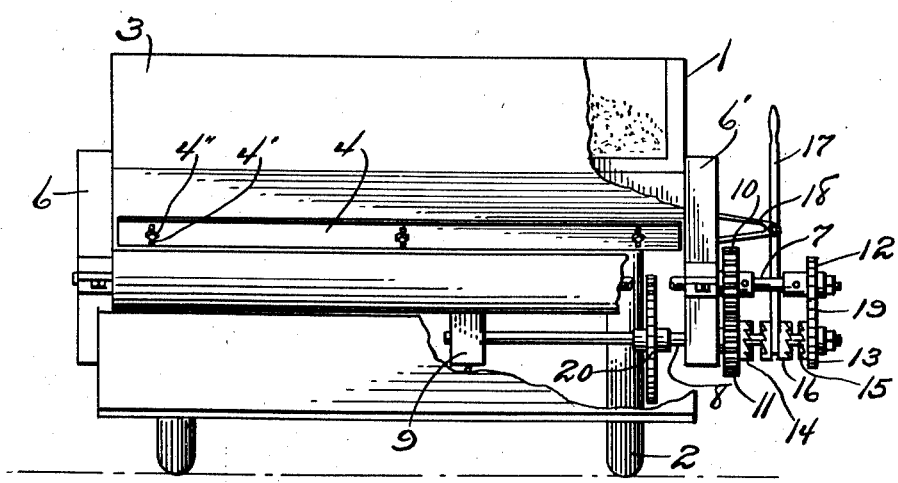
Figure 2 is a rear elevation thereof with parts broken away.

When the slidable clutch 16 is in the position illustrated in Figure 2 of the drawings, the vehicle may be propelled without delivering the material therefrom. When the lever 17 is swung to bring the clutch member 16 to engage the clutch surface 14 on the wheel 11, the said wheel will be locked to the shaft 8, and thereby cause the shaft 7 to turn and to impart motion to the roller 23 in the direction of the arrow A in Figure 1 of the drawings. When the device is brought to such position the truck 1 travels ahead, and the material from the chute 3 delivered onto the endless conveyor 26 will be deposted therefrom onto the guide board or plate 28 and from thence onto the road bed. When the truck is to be backed the lever 7 is swung to bring the clutch element 16 into engagement with the clutch surface 15 on the sprocket wheel 12. This causes the sprocket wheel 13 to turn in the direction of the arrow B in Figure 1, and causes the shaft 7 to travel in a reverse direction, or in the direction of the arrow A. Thus the conveyor has its upper lead always moving outwardly, and it is thought the foregoing description when taken in connection with the drawings will fully set forth the advantages as well as the operation of my invention to those skilled in the art to which such inventions relate.

It is, of course, to be understood that the improvement may be attached to the rear of any ordinary wheeled vehicle or truck and does not necessarily provide the end of an open bodied truck. In Figures 3 and 4 the improvement is disclosed attached to a truck body whose end is closed by a gate or the like. In this instance, the material is shoveled or otherwise directed into the chute 3. Also it is obvious that suitable means may be employed for supporting the upper lead of the endless delivery belt and also that a belt tightener may be employed.

In Figure 3 I have illustrated the manner in which the material may be delivered at any desired angle laterally toward or away from the rear of the vehicle. The directing board 28' is pivotally supported on a bracket 50. The lower outer end of the board 28' has pivotally secured to its edges links 51. These links are telescopically received in socket members 52 which are pivotally supported from the brackets. The socket members are slotted and passing through the slots and engaging with the links there are binding elements 53. By this arrangement it will be noted that the directing board may be swung and sustained either at the full line position in Figure 3 or at the dotted line position of the said figure, as well as at other varying and desired angles.

In Figure 4 I have disclosed a means for adjusting the valve plate 4. The securing means for the valve plate is similar to that above described but the said plate, in this instance, has an outstanding lug 54 provided with a threaded opening. The threads in this opening are engaged by threads on a rod 55 supported for turning in a bracket 56 which is secured to the rear of the chute. The rod 55 has its upper or outer end cranked to provide a handle 57. It is obvious that when the bolts are loosened and the rod is turned that the plate 4 may be moved toward or away from the conveyor.

In some instances it may be found desirable to permit free turning of the wheels 2 of the vehicle without influencing the mechanism comprising my improvement. To accomplish this I have illustrated in Figures 6 and 7 of the drawings, an angular member 58 which is bolted or otherwise secured around the hub of the wheels 2. The member 58 has an outwardly centrally flared portion terminating in an angle flange 59. On this flange there is bolted a plate 60. Arranged between the plate and the inner straight portion 61 of the member 58 there is the hub of a sprocket wheel 62, similar to the sprocket wheel 21. Between the spokes the wheel 62 is provided with notches, any one of which is designed to receive therein a locking dog 63 which is pivoted, as at 64, to the member 58. Suitable means is provided for retaining the dog 63 out of engagement with the notches in the sprocket wheel so that the ground wheel of the machine can travel freely without influencing the sprocket wheel.

It is of course, within the province of the invention to allow the material to drop from the hopper directly onto a roller and thereby dispense with the employment of the endless conveyor. The roller may be driven directly by the drive wheel.

The nature of the invention is such as to render the same susceptible to changes and modifications, and therefore it is to be understood that I am not to be restricted to the illustrated embodiment of my invention as herein set forth, but may make such changes therefrom as fairly fall within the scope of what I claim.

Having described the invention, I claim:—
1. In a device of the character described, the combination with a wheeled vehicle body, of a chute mounted at the rear end thereof, a rearwardly discharging conveyor mounted beneath the lower end of the chute, and means for guiding the material, said means being located beneath the conveyor and including a rearwardly extending supporting bracket, a division board pivotally mounted upon said bracket, and means for adjusting said board to extend the same in inclined position downwardly and either forwardly or rearwardly whereby to deflect the material discharged from the conveyor rearwardly or forwardly as the vehicle travels over the surface of the ground.

2. In a device of the character described, the combination with a vehicle body mounted on ground engaging wheels of a discharge chute, mounted at the rear end thereof and having an open bottom, the body being adapted to contain material adapted to pass into said chute, discharge means located beneath the chute, and guide means for the material located beneath said discharge means and comprising a stationary rearwardly extending bracket, a division board pivoted intermediate its ends upon said bracket, a retaining element carried by the body beneath said distributing means and acting as a guide, and a link pivotally connected with the lower free edge of said division board and having an elongated slot therein for the accommodation of said retaining and guide means whereby the division board may be mounted to extend selectively in rearwardly and downwardly inclined position, depending position, or forwardly and downwardly inclined position.

In testimony whereof I affix my signature.

JOHN A. KENNEY.